May 26, 1959 H. A. PERKINS, JR 2,888,577
MEMORY ELEMENTS FOR CONTROL SYSTEMS
Filed Dec. 15, 1955
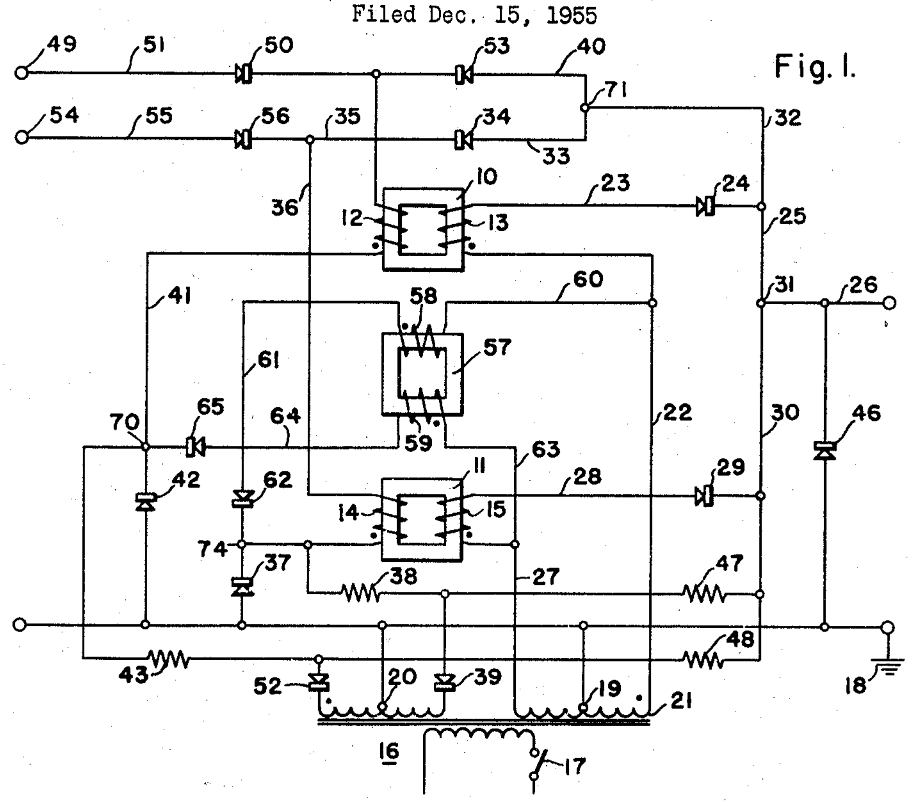
Fig. I.
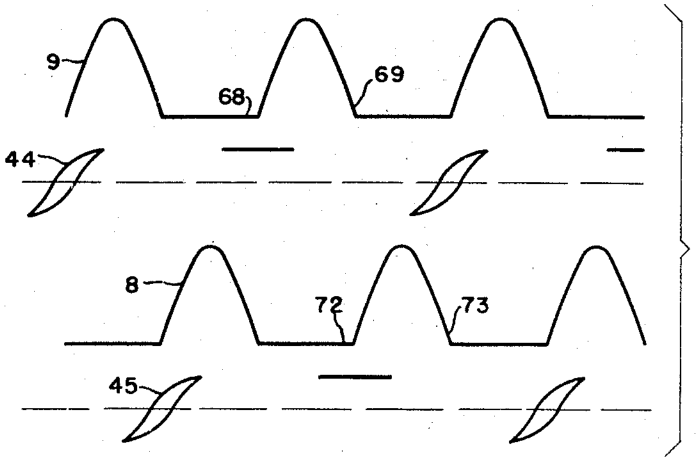
Fig. 2.
WITNESSES
Wm. B. Sellers.
James F. Young
INVENTOR
Harley A. Perkins, Jr.
BY
Ezra L. Savage
ATTORNEY 2,888,577

MEMORY ELEMENTS FOR CONTROL SYSTEMS

Harley A. Perkins, Jr., Baldwin Township, Allegheny County, Pa., assignor to Westinghouse Electric Corporation, East Pittsburgh, Pa., a corporation of Pennsylvania Application December 15, 1955, Serial No. 553,295
5 Claims. (Cl. 307—88)

The invention relates generally, to memory elements and, more particularly, to memory elements for control systems.

An object of the invention is to provide for a continuation of the functions being effected through a memory element of a control system upon the restoration of power after an interruption of power has occurred.

Other objects of the invention will, in part, be obvious and will, in part, appear hereinafter.

The invention, accordingly, comprises the features of construction, combination of elements and arrangement of parts which will be exemplified in the system hereinafter set forth, and the scope of the application of which will be indicated in the claims.

For a fuller understanding of the nature and objects of the invention, reference should be had to the following detailed description taken in connection with the accompanying schematic diagrams, in which:

Figure 1 is a circuit diagram of a memory element of a control system embodying the features of the invention; and Fig. 2 is a schematic diagram illustrating the functioning of the invention.

In the memory element for a control system illustrated in Fig. 1, a number of non-linear devices which will be described in detail hereinafter are employed in the circuits which will be described and traced. The non-linear devices are so disposed in the circuits that they permit the flow of a predetermined magnetizing current to the coils or windings on the core members without any substantial voltage drop, and they also protect the circuits and apparatus from excessive current flow. Further, as the description proceeds and the circuits are traced, it will seem that in some instances the electric currents flow through rectifiers or diodes in the backward or reversed direction. What actually happens is that there is a reduction in the electric current flowing in the forward direction in the circuits. The reduction in current flow may be predetermined by design to effect the performance of functions required from the control system of which the memory element is a part.

In order to explain this embodiment of the memory element for a control system, the circuits will now be traced and the functioning of the memory element will be revealed as the specification proceeds.

Referring now to the drawing and Fig. 1 in particular, the memory element for a control system comprises a plurality of cores 10 and 11. The core 10 is provided with a plurality of windings 12 and 13, while the core 11 is provided with windings 14 and 15. In this embodiment of the invention, the windings 12 and 13 and 14 and 15 are illustrated as having the same number of turns. The usual practice in the design of this device is to provide the winding 12 with a smaller number of turns than the winding 13, and the winding 14 with a smaller number of turns than the winding 15. However, it will be appreciated that the relation of the turns in the associated windings on the cores 10 and 11 will depend to a great extent on the requirement of design for performing predetermined functions.

A source of power, which in this embodiment of the invention is a transformer shown generally at 16, is provided for supplying current for the gating and resetting circuits to be described hereinafter. The primary winding of the transformer 16 will be connected to some suitable power line (not shown) through a breaker or switch illustrated schematically at 17. The neutral point of the secondaries of the transformer are connected to ground at 18.

The gating circuit for the winding 13 of the core 10 may be traced from the secondary winding section 21 through conductor 22, the winding 13, conductor 23, rectifier or diode 24, conductor 25, to the output circuit 26.

The gating circuit for the winding 15 on the core 11 may be traced from the opposite terminal of the secondary winding 21 of the transformer 16, through conductor 27, the winding 15, conductor 28, rectifier or diode 29, conductor 30, to the output circuit 26. It will be observed that the gating circuits for the cores 10 and 11 are connected to a common point of the output circuit 26.

A control circuit for the winding 14 of the core 11 extends from the common point of connection 31 of the two gating circuits and the output circuit 26 through conductors 25, 32 and 33, rectifier 34, conductors 35 and 36, the winding 14, to a non-linear device comprising rectifier 37 and resistor 38.

As illustrated, the non-linear device to which the winding 14 is connected, is connected to ground at 18 through the rectifier 37 and to the secondary of the transformer 16 through the resistor 38 and rectifier 39.

A control circuit for the winding 12 of the core 10 extends from the common point of connection 31 of the gating circuits, through conductors 25, 32 and 40, rectifier 53, the winding 12, conductor 41, to a non-linear device. This non-linear device comprises a rectifier 42 connected to ground at 18 and a resistor 43 connected to a terminal of the secondary of the transformer 16 through rectifier 52. Assuming now that the breaker 17 is closed, and that power is applied to the memory element of the control system from the transformer 16, assume that current flows from the secondary 21 of transformer 16 to the winding 13 as indicated by the dot. The core 10 will now be driven to positive saturation.

In apparatus of this type, the design is such that during the first half of the first cycle the power delivered to winding 13 will be absorbed in driving the core 10 to positive saturation; that is, driving it toward the top of the hysteresis loop illustrated at 44. During the second half of the cycle, current will flow through the gating circuit for the winding 15 entering at the dot illustrated. The core 11 will be driven to positive saturation; that is, to the top of the hysteresis loop 45.

On the first half of the second cycle, current will flow from the secondary of the winding 21 of the transformer 16 into the winding 13 at the point illustrated by the dot, and since the core is already positively saturated, the energy delivered will not be absorbed in the saturation process and will build up an output through the output circuit 26. When an output is delivered, current will flow from the common point of connection of conductors 25 and 30 through conductors 25, 32 and 33, rectifier 34, conductors 35 and 36, through the winding 14, to the non-linear device described hereinbefore. This feedback current will flow into the winding 14 at a point opposite to that indicated by the dot and will drive the core 11 toward negative saturation.

On the next half cycle, current will be delivered to the winding 15 at the end indicated by the dot, but since it was driven to negative saturation in the previous half cycle, the winding 15 will merely drive the core 11 to positive saturation and will not generate an output, with the result that substantially no current will flow to the output circuit 26 during this half cycle. The result is that after the memory element has developed an output from one of the cores 10 or 11 through windings 13 or 15 respectively, the other core will be reset by the feedback current from the developed output. In the case assumed, that is when the core 10 is driven to positive saturation in the first half of the first cycle and an output developed and delivered to the output circuit 26 in the first half of the second cycle then a current will be delivered through the feedback circuit to the reset winding 14 driving the core 11 toward negative saturation. Under such conditions, output will be delivered to the output circuit 26 through winding 13 for half of every cycle as illustrated by the diagram 9 in Fig. 2. The current delivered is a pulsating direct current.

The output circuit 26 is connected to none-linear devices and thereby develops a voltage to ground. When the gating circuit through the winding 13 is established, the non-linear device which functions with the output circuit comprises the rectifier 46 grounded at 18 and the resistor 47 connected to one terminal of the secondary winding of the transformer 16 through rectifier 39. When the core 11 is driven toward positive saturation through the winding 15, the non-linear device which functions in conjunction with the output circuit 26 comprises the rectifier 45 grounded at 18 and the resistor 48 which is connected to the other terminal of the secondary of the transformer 16. The gating circuit for the core 10 established and traced has developed an output through the conductor 26 and driven a core 11 through the feedback to negative saturation or to the bottom of the hysteresis loop 45.

An output source 49 is provided for interrupting the output through the circuit 26. This input may be from a direct current source or an alternating current source. If from an alternating current source, provision will be made to deliver a current which is 180° out of phase with the current flowing in the winding 13. In the design of the memory element, the voltage applied at 49 will be such that it will supply to the core 10 a sufficient number of ampere turns to drive the core to the bottom of the hysteresis loop 44.

As illustrated, a rectifier 50 is connected in the conductor 51 extending from the source of power 49 to the terminal of the reset winding 12 provided on the core 10. The rectifier 50 prevents the flow of current to the source 49 when feedback occurs from the gating circuit for the winding 13.

The reset circuit for the reset winding 12 of the core 10 may be traced from the power source 49, conductor 51, rectifier 50 through winding 12, conductor 41, to a non-linear device comprising the rectifier 42 and the resistor 43. The core 10 is now driven to negative saturation and the current flow through the gating circuit to the output circuit 26 is interrupted. On the interruption of the output current, there will be no feedback to the reset winding 14 of the core 11 and current on the second half of the cycles now flowing in the gating circuit of winding 15 will drive the core 11 to positive saturation or to the top of the hysteresis loop 45, and then develop a current flow through the gating winding 15 and an output current which will be delivered to the output circuit 26. This output current delivered through the output circuit 26 is illustrated by the curve 8 in the bottom half of Fig. 2, and it also will be a pulsating direct current.

Assuming now that the memory unit and the pulsating direct current delivered to the output circuit 26 through the winding 13 is being utilized for controlling the operation of a machine, such as a planer or drill press, then the movement of the planer in one direction can be interrupted by the delivery of a signal at 49. The output developed from the winding 15 may be utilized for reversing the machine and driving it in the opposite direction.

When an output current is developed through the energization of the gating winding 15, a feedback circuit is established from the point 31 through conductors 25, 32, 40, rectifier 53, to the reset winding 12 of the core 10 and conductor 41 to the non-linear device including the rectifier 42 and the resistor 43. Current flowing in this circuit will drive the core 10 toward negative saturation. Therefore, if the signal delivered from the power source 49 is interrupted, the core 10 will be regularly driven toward negative saturation through the feedback circuit traced hereinbefore.

The current delivered as a result of the positive energization of core 11 will continue indefinitely unless the core 11 is driven toward negative saturation by some additional means. In this embodiment of the invention, a source of power 54 is provided for delivering either direct current or alternating current to supply a reset winding on the core 11. The reset circuit may be traced from the source of power 54 through conductor 55, rectifier 56, conductor 36, winding 14 on the core 11, to the non-linear device including the rectifier 37 and resistor 38. Generally, the number of turns in the winding 14 will be smaller than in the winding 15.

When the supply of current from the winding 15 to the output circuit 26 is interrupted, the feedback circuit to the winding 12 will be interrupted. Therefore, on the supply of current from the transformer winding 21 to the gating winding 13 in the positive direction, as indicated by the dot, the core 10 on the first half cycle will be driven toward positive saturation, and on the first half of the next cycle will deliver an output current which will be delivered to the output circuit 26 through a circuit traced hereinbefore. Further, the feedback circuit through conductor 32, rectifier 34, conductors 35 and 36, to winding 14, to the non-linear device including rectifier 37, resistor 38 will be reestablished, and will drive the core 11 toward negative saturation. Therefore, the delivery of current from the winding 15 to the output circuit 26 will remain interrupted even if the signal from the source of power 54 is discontinued.

If the signal delivered from the power source 54 is alternating current, it will be necessary that it be 180° out of phase with current flowing in the winding 15 on the core 11. Then, it will be opposed to the current flowing in the winding 15 and will drive the core 11 toward negative saturation. If the source of power delivers direct current, it will drive the core to negative saturation in opposition to the winding 15 in view of the arrangement of the winding 14.

There is always a possibility of a memory element, such as described hereinbefore, being interrupted by the failure of power delivered through the transformer shown generally at 16. The failure of power would result in the interruption of delivery of current through the output circuit 26 and may also result in a continuous output condition opposite to that existing before the interruption. This would interfere with the operation of the machine which it is controlling.

If the power failed when the winding 13 was supplying current to the output circuit 26 but near the end of the second half cycle as described above, that is, when current was flowing into winding 15 as indicated by the dot and was reapplied when current was flowing into the winding 15 as indicated by the dot, a different signal would be delivered to the control of the machine. This might result in the damaging of work in the machine.

In order to provide for maintaining to a predetermined extent the magnetic condition existing in the memory element when an interruption of power from the transformer 16 and thereby effect a continuation of a function being performed by the memory element irrespective of the point in the cycle at which power is restored, a retentive device, which in this modification is additional core 57, is employed. This core may be similar to the cores 10 and 11 included in the memory element of the control system.

Two windings 58 and 59 are provided on the core 57 and generally of equal turns. The number of turns in these windings will depend on the conditions to be met and will be predetermined by the designer.

As shown, the winding 58 is connected between the gating circuit for the winding 13 and the non-linear device comprising the rectifier 37 and resistor 38. The supply circuit for this winding 58 extends from the secondary winding 21 of transformer 16 through conductors 22 and 60, winding 58, conductor 61, rectifier 62, to the non-linear device comprising the rectifier 37 and resistor 38.

The winding 59 is connected to the gating circuit for the winding 15 of the core 11. The supply circuit for this winding may be traced from the the secondary winding of the transformer 16, through conductors 27 and 63, the winding 59 on the core 57, conductor 64, rectifier 65, to the non-linear device comprising rectifier 42 and resistor 43.

Assuming now that power fails at the point 68 of the cycle shown on the curve 9 of Fig. 2, then the magnet 10 stands positively saturated or at the top of the hysteresis loop 44 since one half cycle before the time of interruption of power, current was being delivered through the gating winding 13 to the output circuit 26.

If the power was reapplied at the same point in the cycle at which it failed, there would be a continuity of the functioning of the control element hereinbefore described. However, it would only be once in a very great number of times that the power would be applied at or near the same point in the cycle at which it failed. Therefore, provision has to be made to assure continuity in the functioning of the control element.

In order to assure the proper functioning of the control element of the system, the core 57 provided with the windings 58 and 59, which have been described hereinbefore, is provided. The functioning of this core and its windings will now be described.

It has been assumed that the failure of power occurred at point 68 on the curve 9. At that moment, current would be flowing from the secondary 21 of the transformer 16 through conductors 27 and 63, winding 59, conductor 64, rectifier 65, to the non-linear device comprising rectifier 42 and resistor 43. It will be noted that the current flows into the winding at the end identified by the dot which means that the core 57 would be driven to positive saturation.

Before the moment of interruption, a feedback circuit which drove the core 11 toward negative saturation was in existence. This feedback or resetting circuit has been traced hereinbefore and it extends through the conductors 32 and 33, rectifier 34 and conductor 36, to the winding 14. Therefore, when power failure occurs, the winding 15 is not delivering current to the output circuit 26.

Assuming now that power is reapplied at a point 69 on the curve 9, it is immaterial whether a long period of time or a small fraction of a second has elapsed during the interruption of power and the restoration of power. On the restoration of power at the point 69 in the cycle, there will be very little current flow to the winding 13 before a circuit is established from the secondary 21 of the transformer 16, through conductor 27 and the winding 15 of the core 11, conductor 28, rectifier 29, conductor 30, to the output circuit 26. The flow of current through the winding 15 tends to set up a feedback circuit through the winding 12 of the core 10. However, an examination of the circuits will reveal that such a feedback circuit cannot be established.

At the time when the power supply was interrupted, the core 57 stood positively saturated. Therefore, the point 70 on the gating circuit for the winding 59 would stand at the same voltage or potential as a point 71 on the feedback circuit to the winding 12. Consequently, no current will flow and the core 10 will not be driven to negative saturation. It will remain positively saturated which was the state it was in when the power was interrupted. Therefore, because of the positive saturation of the core 57, even if the power is not restored at the same point in the cycle at which it was interrupted, the control system can go through one half cycle of the flow of current to the winding 15 before reaching the point in the cycle at which power was interrupted without substantially changing the magnetic condition of the memory element, and when it arrives at the point in the cycle at which the power was interrupted, the control system will pick up the functioning that was being effected when the power failure occurred. An impulse of current may be delivered during the half cycle in which the current in the control system was flowing to the winding 15 but this will not do more than cause a hesitation in the operation of a power machine which is being controlled by the memory element. Immediately after this hesitation, the memory element will pick up where it left off and carry on in the control of the machine.

Assuming now that the failure of power occurs at point 72 in the curve 8 when current was being supplied in the winding 15 to the output circuit 26 and the core 10 was negatively saturated through its feedback circuit described hereinbefore. Then core 57 would stand negatively saturated and point 74 would stand at the same potential as point 71. On restoration of power, for example at 73, current would flow from the secondary 21 of the transformer 16 through the winding 13 of core 10. However, a feedback circuit could not be established since points 71 and 74 stand at the same potential. Consequently, the core 57 would again block any substantial change in the magnetic condition of the memory element of the system. There would be a pause in the operation as a result of the current flow through the winding 13. However, as soon as the point in the cycle is reached at which the failure of power occurred, the memory element would immediately start performing the function that was being performed at the moment when the interruption of power occurred.

It will thus be evident that the retentive element comprising the core 57 and windings 58 and 59 functions to maintain the magnetic condition existing in the cores 10 and 11 close enough to the state in which they were when the power was interrupted to assure a continuation of the function being performed, and such function will be continued irrespective of the point in the cycle of power at which the restoration of power is effected. Thus, I have provided a memory element which is unaffected by a failure of power. A retentive element will prevent the improper functioning of the circuit until the power delivered on the restoration of power reaches the point in the cycle at which the interruption occurred and then the memory element will continue its operation. If the memory element is utilized for driving a planer, there may be a pause in the functioning of the planer, but then it will promptly continue in the direction in which it was moving when the interruption of power occurred.

It will be noted that the curves 8 and 9 are so located relative to one another that they show the relation of the current half cycles delivered through the windings 15 and 13, respectively, to the output circuit 26. The location of the hysteresis loops relative to curves 8 and 9 has no significance except appearance.

Since certain changes may be made in the above construction, and different embodiments of the invention could be made without departing from the scope thereof, it is intended that all matter contained in the above description or shown in the accompanying diagrams shall be interpreted as illustrative and not in a limiting sense.

I claim as my invention:

1. In a memory element of a control system, in combination, a plurality of cores, a plurality of windings on each core, a source of power, a reset circuit connecting one winding of each core to the source of power, a gating circuit connecting another winding of each core to the source of power, an output circuit connected to the gating circuits, the gating circuits and the reset circuits being so interconnected that when the output is being delivered through one gating circuit no output current is delivered through the other gating circuit, and output current is therefore delivered for one half cycle out of every cycle, circuits for delivering signals through each of the reset circuits, the circuits for delivering signals and the gating windings being so arranged that the cores may be driven to negative saturation when signals are received to effect an interruption of the output, an additional core having high retentivity, a plurality of windings on said additional core, the windings on the additional core being so connected in circuit relationship with the gating circuits as to provide in cooperation with said additional core retentive means for maintaining a magnetic condition in the memory element upon failure of power which assures on the restoration of power a continuation of the function being performed when the power supply was interrupted.

2. In a memory element of a control system, in combination, a plurality of cores, a plurality of windings on each core, a source of power, a reset circuit connecting one winding of each core to the source of power, a gating circuit connecting another winding of each core to the source of power, an output circuit connected to the gating circuits, the gating circuits and the reset circuits being so interconnected that when output is being delivered through one gating circuit no output current is delivered through the other, an output current is delivered for one half cycle out of every cycle, circuits for delivering signals through each of the reset circuits, the circuits for delivering signals and the gating windings being so arranged that the cores may be driven to negative saturation when signals are received to effect an interruption of the output, an additional core having high retentivity, a plurality of windings disposed on the additional core, one winding on the additional core being connected in circuit relationship with the gating circuit for one of the cores, and the other winding of the additional core being connected in circuit relationship with the gating circuit of the other core, the windings on the additional core in cooperation with said additional core serving to maintain the magnetic condition existing in the system on the failure of power thereby to continue any predetermined functioning of the system upon a restoration of power.

3. In a memory element of a control system, in combination, a plurality of cores, a plurality of windings on each core, a source of power, a reset circuit connecting one winding of each core to the source of power, a gating circuit connecting another winding of each core to the source of power, an output circuit connected to the gating circuits, the gating circuits and the reset circuits being so interconnected that when output is being delivered through one gating circuit no output current is delivered through the other gating circuit, and output current is delivered for only one half cycle out of every cycle, circuits for delivering signals through each of the reset circuits, the circuits for delivering signals and the gating windings being so arranged that the cores may be driven to negative saturation when signals are received to effect an interruption of the output from either gating circuit, an additional core having high retentivity, a plurality of windings on said additional core, a plurality of non-linear devices, one of the windings on the additional core being connected between the gating circuit of one of the plurality of cores and a non-linear device to establish a magnetic condition in the additional core having a predetermined relation to the magnetic condition of the core in the gating circuit to which it is connected, the other winding on the additional core being connected between the gating circuit for another of the plurality of cores and a non-linear device to provide a magnetic condition in the additional core having a predetermined relation to the magnetic condition in said another of the plurality of cores, the magnetic condition established in the additional core upon failure of power from the source of power serving to effect a continuation of the function being performed by the memory element of the control system when a restoration of power occurs.

4. In a memory element for a control system, in combination, a plurality of cores, a plurality of windings on each core, a source of power, a reset circuit connecting one winding of each core to the source of power, a gating circuit connecting the other windings of each core to the source of power, an output circuit connected to the gating circuits, a feedback circuit connecting the output circuit to the reset circuits, the feedback circuit for one gating circuit being disposed to deliver current to the reset circuit for the other core whereby when the current flows through one gating circuit causing the flow of current to the output circuit the core associated with the other gating circuit is driven toward negative saturation and no current is delivered through said other gating circuit to the output circuit and a retentive element comprising a core having high retentivity and two windings on the core, each winding of the retentive element being connected between the gating winding for one core and the reset winding for the other core, whereby if the power to the gating circuits is interrupted and restored the memory element will continue the function it was performing irrespective of the point in the current cycle at which the power is restored.

5. In a memory element for a control system, in combination, a plurality of cores, a plurality of windings on each core, a source of power, a reset circuit connecting one winding of each core to the source of power, a gating circuit connecting the other winding of each core to the source of power, an output circuit connected to the gating circuits, a feedback circuit for each gating circuit, the feedback circuit for one gating circuit being disposed to deliver current to the reset circuit for the other core whereby upon the current flow through one gating circuit causing the flow of current to the output circuit the core associated with the other gating circuit is driven toward negative saturation and no current is delivered through said other gating circuit to the output circuit, and a retentive element comprising a core having high retentivity and a plurality of windings on the core, one winding of the retentive element being connected between one terminal of the source of power and the feedback circuit connected to the reset circuit of the winding of one core, the other winding of the retentive element being connected between the other terminal of the power source and the feedback circuit connected to the reset circuit of the winding of the other core thereby to maintain a magnetic condition in the memory element to assure a predetermined substantially continuous functioning of the element upon the restoration of power after a failure of power.

No references cited.